(12) United States Patent
Galjaard et al.

(10) Patent No.: US 9,526,255 B2
(45) Date of Patent: Dec. 27, 2016

(54) DEVICE FOR ADJUSTING THE HEIGHT OF A RACK IN A RACK OVEN

(75) Inventors: Anton Galjaard, Rosersberg (SE); Tom Halve, Nortalje (SE)

(73) Assignee: REVENT INTERNATIONAL AB, Upplands Vasby (SE)

( * ) Notice: Subject to any disclaimer, the term of this patent is extended or adjusted under 35 U.S.C. 154(b) by 223 days.

(21) Appl. No.: 14/116,490

(22) PCT Filed: May 10, 2012

(86) PCT No.: PCT/EP2012/058665
§ 371 (c)(1),
(2), (4) Date: Nov. 8, 2013

(87) PCT Pub. No.: WO2012/152876
PCT Pub. Date: Nov. 15, 2012

(65) Prior Publication Data
US 2014/0083308 A1    Mar. 27, 2014

(30) Foreign Application Priority Data

May 10, 2011 (SE) ...................................... 1150412

(51) Int. Cl.
*A21B 1/44* (2006.01)
(52) U.S. Cl.
CPC ...................................... *A21B 1/44* (2013.01)
(58) Field of Classification Search
CPC ........... A23B 4/052; A23B 7/144; A23B 3/04; B65G 21/18; B65G 2207/24
(Continued)

(56) References Cited

U.S. PATENT DOCUMENTS

| | | | |
|---|---|---|---|
| 3,537,405 A | 11/1970 | Verhoeven | |
| 3,641,945 A | 2/1972 | Tillander et al. | |
| 2009/0311399 A1 | 12/2009 | Koos | |

FOREIGN PATENT DOCUMENTS

| | | |
|---|---|---|
| BE | 1 013 806 | 9/2002 |
| DE | 19903048 | 8/2000 |

(Continued)

OTHER PUBLICATIONS

International Search Report dated Nov. 21, 2012; corresponding to PCT/EP2012/058665.

(Continued)

*Primary Examiner* — David Angwin
*Assistant Examiner* — Thomas Ward
(74) *Attorney, Agent, or Firm* — Young & Thompson

(57) ABSTRACT

Disclosed is a device (10) in a rack oven (1) for adjusting the mutual height between a support (2) including horizontal heat preserving plates (3) and a bread-carrying rack (4) of breads, which device includes a first connection point (13) for connection to the heat preserving support (2) inside the oven (1); a first driving arrangement (11) for regulating the height of the first connection point (13) and the heat preserving plates (3) of the support from a first, passive position to a second, active position. A second driving arrangement (12) including a second connection point (14) for connection to the bread-carrying rack is arranged to adjust the height of the second connection point (14) with respect to the first connection point (13) in order to adjust the distance between the horizontal heat preserving plates (3) of the support (2) and the bread-carrying rack (4).

15 Claims, 6 Drawing Sheets

Figure 1:
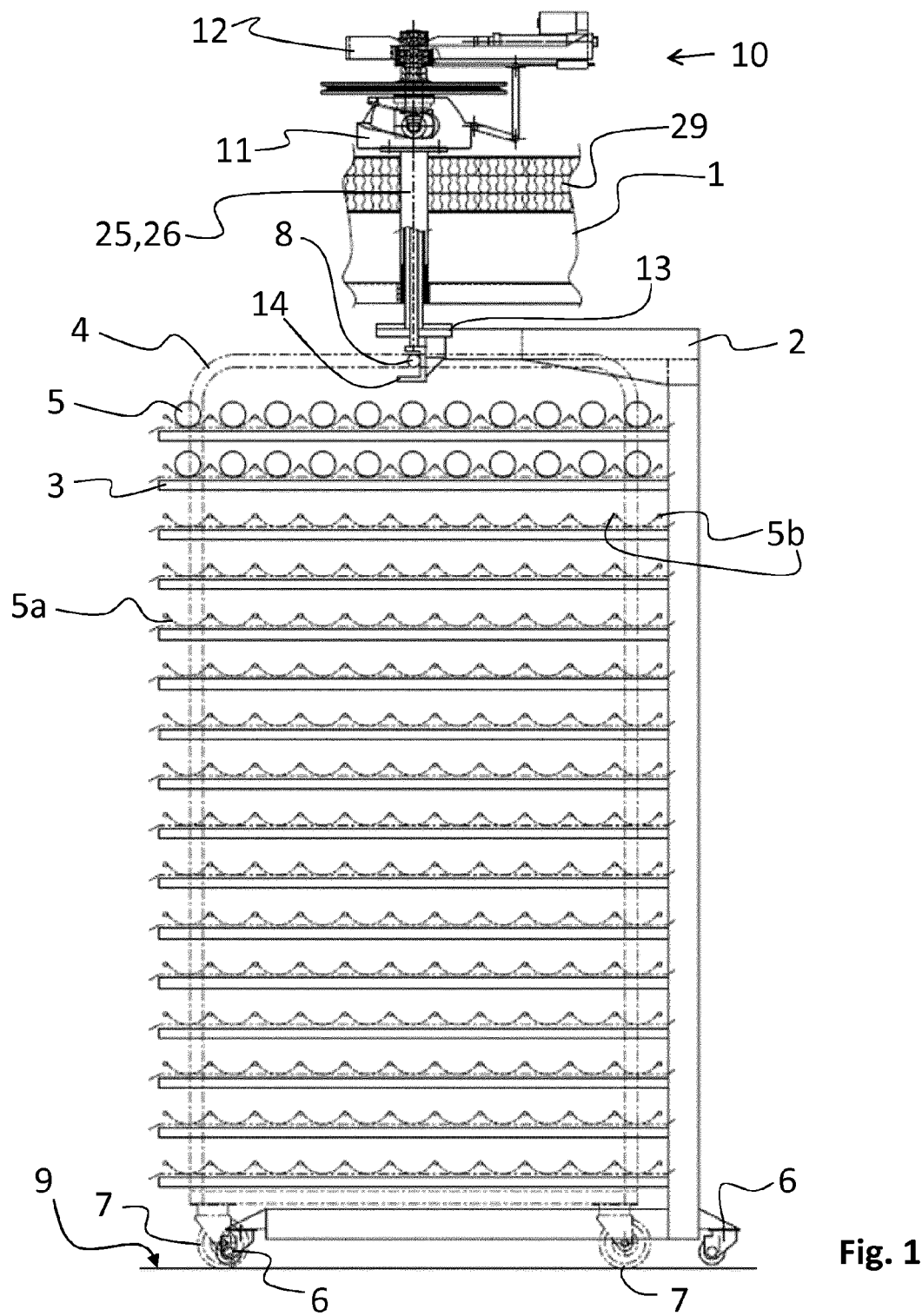

(58) Field of Classification Search
USPC .......................................... 99/352; 426/523
See application file for complete search history.

(56) References Cited

FOREIGN PATENT DOCUMENTS

| | | |
|---|---|---|
| DE | 201 01 501 | 4/2001 |
| EP | 1 908 350 | 4/2008 |
| FR | WO/2011/07305 | * 7/2011 |
| JP | 53-117188 | 10/1978 |
| JP | 58-138213 | 8/1983 |
| JP | 2001-245579 | 9/2001 |
| JP | 2001-245581 | 9/2001 |
| JP | 3631089 | 3/2005 |
| JP | 2008-199934 | 9/2008 |
| WO | 2011/107305 | 9/2011 |

OTHER PUBLICATIONS

Notice of Reasons for Rejection dated Mar. 16, 2016, with English Translation; Application No. 2014-509735.

* cited by examiner

DEVICE FOR ADJUSTING THE HEIGHT OF A RACK IN A RACK OVEN

TECHNICAL FIELD

The invention relates to a device in a rack oven for adjusting the distance between a support that comprises horizontal heat preserving plates and a bread-carrying rack. The invention also relates to a rack oven comprising such a device.

BACKGROUND

There are several types of ovens, which all present their own different individual advantages. In traditional stone ovens, such as e.g. pizza ovens, the bread is placed on a hot stone base. The hot stone heats the bread from below at the same time as the hot air inside the oven heats the upper surface of the bread. In conventional rack ovens the bread is instead placed on plates that are held by a rack, which is to be inserted into a so-called rack oven.

A major advantage of a rack oven is that the amount of manual involvement is minimised, because a large quantity of bread may be put in and out of the oven in one single operation. Further, it is energy saving with respect to a stone oven, because a lot of heat is lost as the oven door is continuously open and closed in a conventional stone oven.

There are however advantages of a conventional stone oven that are difficult to accomplish by a rack oven. For example some types of bread need to be heated from below in order to obtain the right richness or consistency.

BE 1 013 806 discloses a baking oven comprising heat preserving plates arranged at a distance, one above the other. A rack of baking plates, which are arranged at the same distance from each other, may then be inserted into the oven, such that each bread-carrying plate will be located above a heat preserving plate. The baking oven includes an arrangement for raising the heat preserving plates such that the distance between the heat preserving plates and the baking plates may be adjusted and such that contact may be made there between.

The arrangement in BE 1 013 806 does not provide the possibility of adapting the contact level in the breads and the heat preserving plates, because the breads are located on baking plates. Further, a problem with the arrangement in BE 1 013 806 is that it will be almost impossible to obtain a uniform heat in the oven.

SUMMARY

An object of the invention is to provide an improved rack oven without some of the drawbacks of the prior art.

According to a first aspect the invention relates to a device in a rack oven for adjusting the distance between a support comprising substantially horizontal heat preserving plates and a bread-carrying rack, which device comprises a first connection point for connection to the heat preserving support inside the oven; a first driving arrangement for regulating the height of the first connection point and the heat preserving plates of said support from a first, passive position to a second, active position. Further, a second driving arrangement including a second connection point for connection to the bread-carrying rack is arranged, wherein the second driving arrangement is arranged to adjust the height of the second connection point with respect to the first connection point and thereby to simultaneously adjust the distance between all the horizontal heat preserving plates of the support and the bread-carrying rack.

According to a second aspect the invention relates to a rack oven comprising such a device.

The device and the oven comprising the device according to the invention provide an improved rack oven with respect to existing prior art ovens. A first advantage resides in that the oven provides the possibility of obtaining a uniform heat in the whole of the oven and for all the different levels of bread in the rack oven, because both the rack and the support may be lifted. Further, the oven presents the possibility of adapting the distance between the suspended bread pieces and the heat preserving plates located inside the oven. These features present a very good possibility of adapting the baking procedure to any desired condition, while at the same time presenting the possibility of obtaining predictable and repeatable conditions for consecutive baking operations.

Preferred embodiments of the invention and its advantages will be apparent from the detailed description and the dependent claims.

SHORT DESCRIPTION OF THE DRAWINGS

Figure 2:
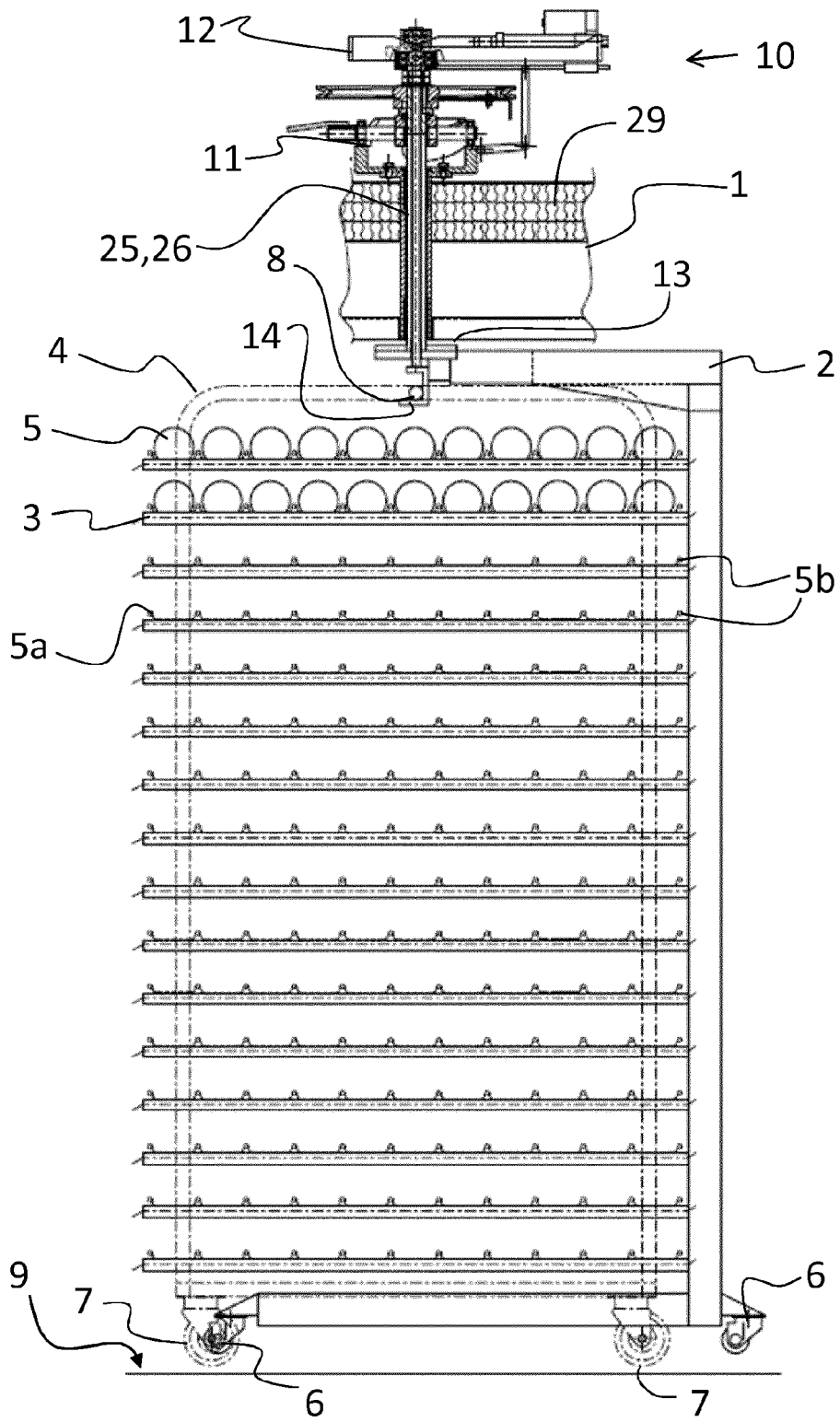
Figure 3:
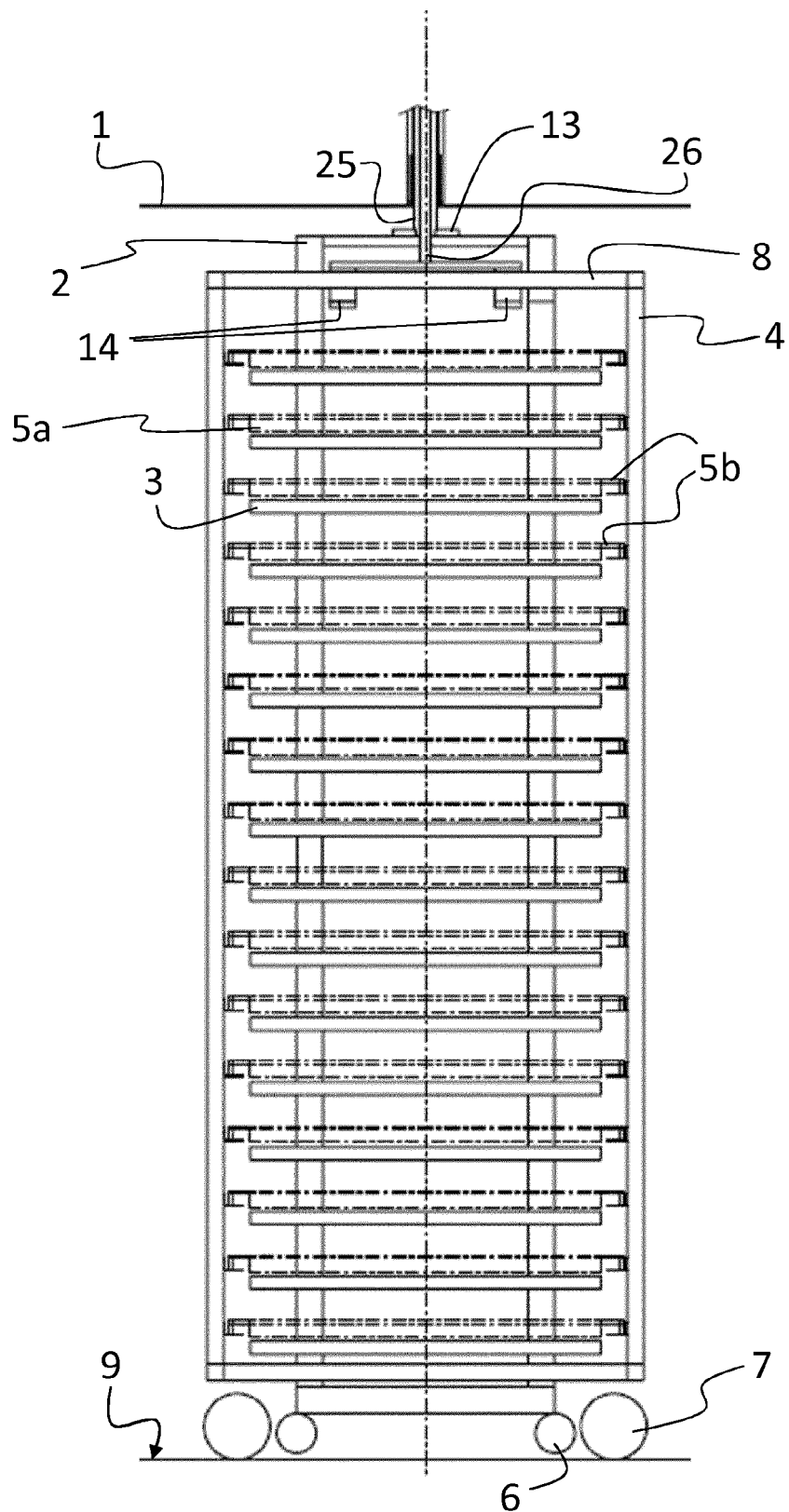
Figure 4:
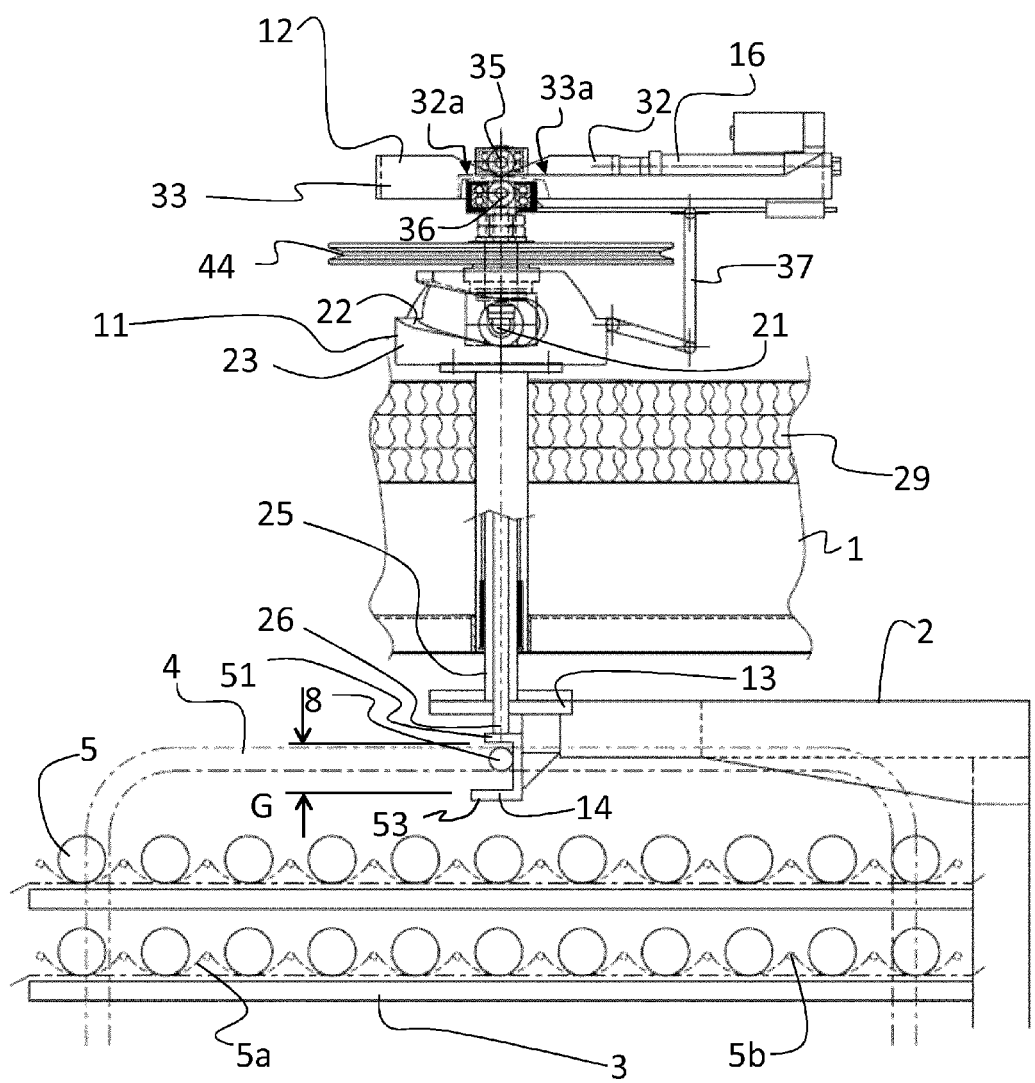
Figure 5:
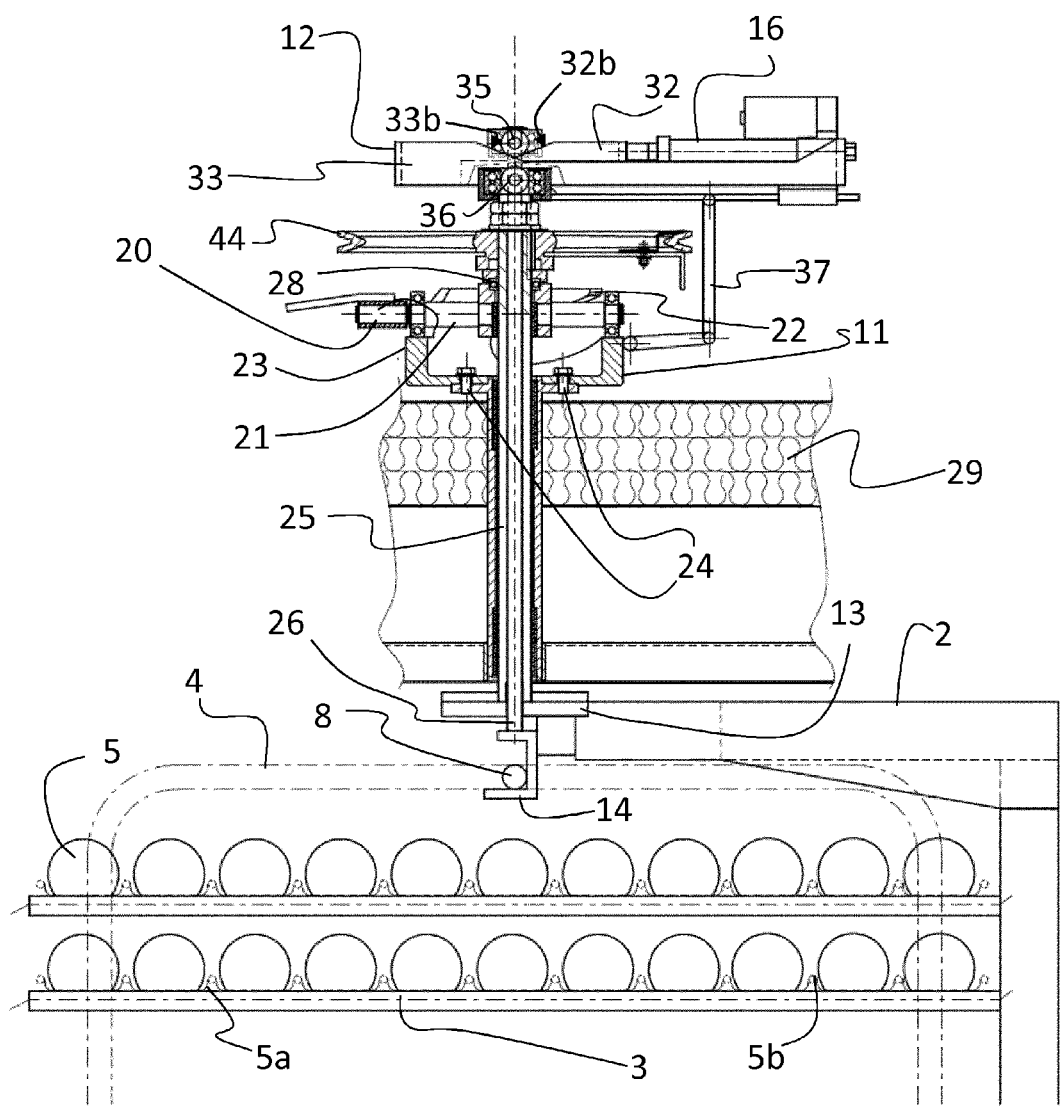
Figure 6:
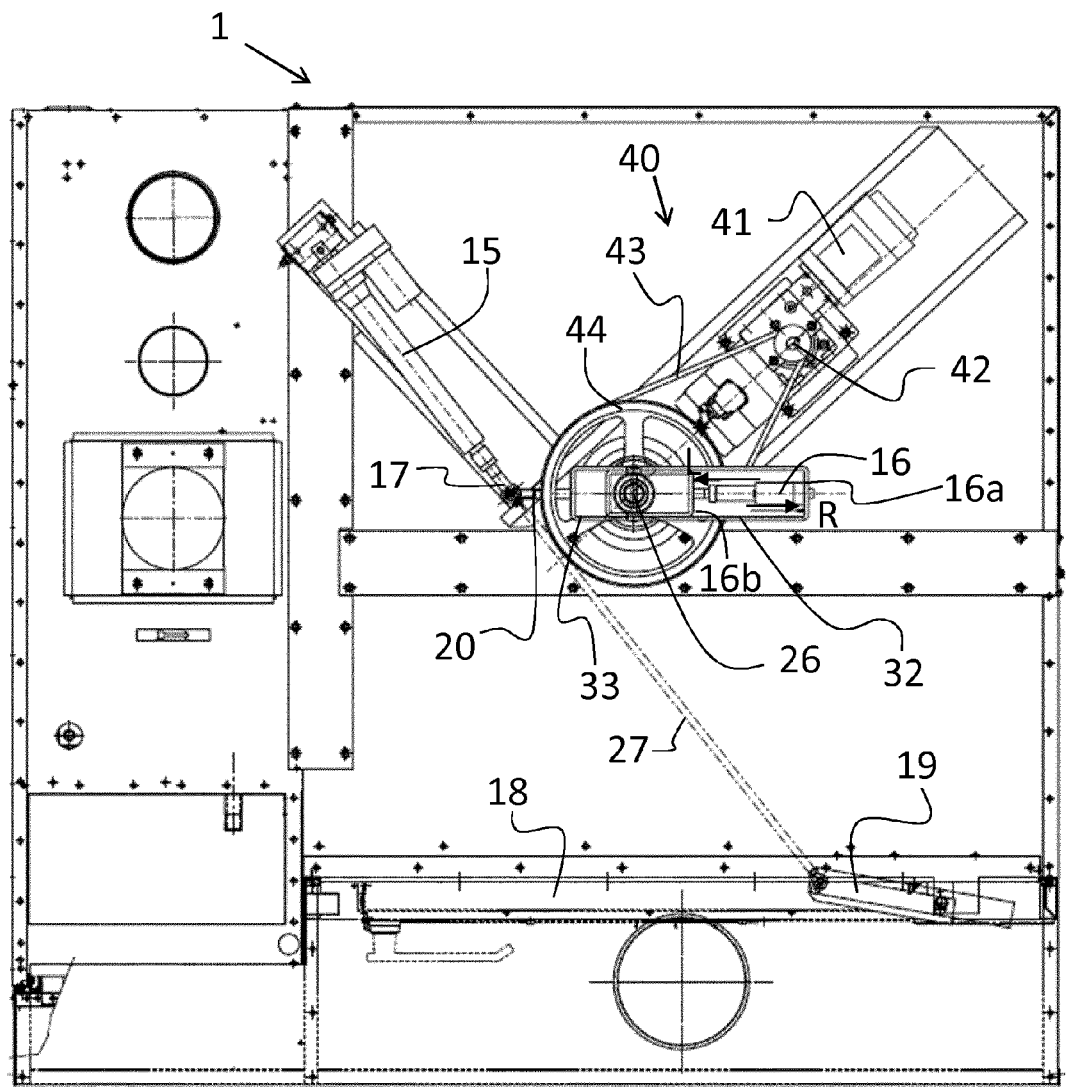

The invention, and further objects and advantages of it, is best understood from the following description with reference to the appended drawings, of which:

FIG. 1 is a schematic side view of an embodiment of the invention in a passive position, FIG. 2 is a schematic side view of the embodiment of FIG. 1 in an active position, FIG. 3 is a schematic front view of an embodiment of the invention in a passive position, FIG. 4 is a detailed side view of an embodiment of the device according to the invention in a passive position, FIG. 5 is a detailed side view of an embodiment of the device according to the invention in a active position, and FIG. 6 is a top view of an embodiment of the device according to the invention.

DETAILED DESCRIPTION

The invention relates to a device 10 for adjusting the height of a bread-carrying rack in a rack oven 1. In FIG. 1 an embodiment of such a device 10 is shown. Two upright stands are shown in the figure. The first stand is denoted a support 2. The support 2 comprises a number of horizontal heat preserving plates 3, which are spaced apart from each other, preferably by equal distances. The second stand is a bread-carrying rack 4 preferably comprising the same number of levels of suspended pieces of bread 5 as there are heat preserving plates. As shown here, the pieces of bread may be carried by one or more levels of flexible bread-supporting material 5a that is held up by bars 5b, such that the flexible material 5a between two bars 5b forms a bed for holding at least one piece of bread 5. The levels of bars 5b and flexible material 5a are spaced apart from each other by a distance that substantially corresponds to the distance between each adjacent pair of heat preserving plates 3. In FIG. 1 the bread-carrying rack 4 has been inserted into the support 2, such that each level of suspended pieces of bread 5 is located above a heat preserving plate 3 but without touching the same.

The device 10 is arranged to adjust the distance between the two stands 2 and 4. In FIG. 1 the bread-carrying rack 4 is at ground level, i.e. with the wheels 7 located on the oven floor 9. This corresponds to a passive position, in which there is no contact between the bread-supporting material 5a carrying suspended pieces of bread 5 and the corresponding heat preserving plates 3 below them. The support 2 may be slightly lifted by device 10 in the passive position, which is illustrated in that the wheels 6 of the support are hanging freely above the oven floor 9.

In FIG. 2 the height adjusting device 10 has been adjusted to a second, active position, in which both the support 2 and the rack 4 have been lifted with respect to their positions in FIG. 1. The support 2 has been lifted to higher degree than the rack 4, such that the heat preserving plate 3 of the support 2 have been lifted into contact with corresponding levels of suspended pieces of bread 5.

As is visible in FIG. 2, both the support 2 and the bread-carrying rack 4 have been lifted in FIG. 2. Further, from the difference in height of the wheels 6 of the support 2 and the wheels 7 of the bread-carrying rack 4, it is apparent that the support 2 has been lifted to a higher degree than the bread-carrying rack 4. To achieve this differentiated lifting, the height adjusting device 10 includes two separate but interconnected driving arrangements 11 and 12.

The first driving arrangement 11 comprises a first connection point 13 for connection to the heat preserving support 2 and the second driving arrangement 12 comprises a second connection point 14 for connection to the bread-carrying rack 4. The first connection point 13 for connection to the heat preserving support 2 may be of a relatively fixed type that is not intended to be disconnected on a regular basis. Namely, the idea of the heat preserving plates 3 is that they shall be left in the oven such that they preserve their inherent heat between two consecutive baking operations. However, as the oven itself may be an all-round rack oven, it may of course be of interest to withdraw the heat preserving support 2 at times when they are not needed in the current baking operation. Hence, the first connection point 13 may be a relatively permanent but preferably releasable connection e.g. including screws. It may however also include some kind of snap attachment. Either way, there are a number of connection means known to the skilled person, which may be easily implemented in the inventive system. The invention is not limited to a specific type of connection means.

The second connection point 14 is preferably of a type that is more easily interconnectable to, and releasable from, the bread-carrying rack 4. From FIG. 3 it is apparent that the shown embodiment of the second connection point 14 is comprised of two spaced apart hooks into which a horizontal bar 8 of the bread-carrying rack 4 will fit automatically as the rack is introduced into the oven 1. In FIG. 1 only one hook is visible, whereas in FIG. 3 both hooks that constitute the second connection point 14 are visible. In the shown embodiment the height difference between the jaws 51, 53 of each of the hooks defines a vertical gap G (shown in FIG. 4), into which the horizontal bar 8 of the rack 4 fits easily. These gaps of the second connection point 14 are sufficiently large such that different racks 4 of slightly different height may fit inside it.

In FIGS. 1 and 3 there is a gap below the horizontal bar 8 with respect to the hooks of the connection point 14. In FIG. 2 on the other hand, the gap below the bar 8 has been reduced to zero, such that the horizontal bar 8 rests on the lower jaws 53 of the hooks of the second connection point 14. The rack 4 has been lifted by the horizontal bar 8 in said connection point 14 into an active position where the rack 4 hangs freely in the air. In this position there is instead a gap above the horizontal bar with respect to the upper jaws 51 of the hooks of the connection point 14.

From FIG. 2 it is further apparent, e.g. by comparing the height of the pieces of bread 5 to the heat preserving plates 3, that the support 2 has been lifted to a higher degree than the rack 4. The difference in lifted height mainly corresponds to the initial gap below the horizontal bar 8 with respect to the lower jaws of the hooks of the connection point 14. This is due to the fact that the first driving arrangement 11 lifts both of the connection points 13 and 14 simultaneously and to the same degree. Hence, the height difference comes from the fact that the rack 4 is not lifted until the lower jaws of the hooks of the second connection point 14 have been raised into contact with the horizontal bar 8 of the rack 4. However, as will be described below, part of the height difference also corresponds to the action of the second driving arrangement. The function of the first and second driving arrangements 11 and 12 will be described in detail below with reference to FIGS. 4-6.

In the shown embodiment the first and second driving arrangements 11 and 12 are arranged in the upper side of the oven and are connected to the inside of the oven via shafts 25 and 26. The shafts 25 and 26 are arranged such that they extend through the insulation 29 of the oven 1.

In FIG. 4 the height adjusting device 10 is positioned in the passive position corresponding to the position shown in FIG. 1. FIG. 5 is sectional view of the height adjusting device 10, in which the device is shown in the active position corresponding to the position shown in FIG. 2. The first driving arrangement 11 is arranged to move both the rack 4 and support 2 between the active and passive position, whereas the second driving arrangement 12 is arranged to fine adjust the position of the suspended pieces of bread 5 with respect to the heat preserving plates 3 in the active position and only moves rack 4.

As is apparent from FIG. 4 the passive position offers a vertical gap between the pieces of bread 5 and the heat preserving plates 3. This gap is useful as it allows the rack 4 to be moved in and out of the oven unhindered. It may be important that the gap is sufficiently big in order to prevent that the material 5a that holds the pieces of bread 5 touches the plates 3. Even the slightest contact may namely lead to that the material is held back, such that breads will be misshaped, e.g. not symmetrical in their cross sectional view.

The first driving arrangement 11 comprises a first actuator 15 (see FIG. 6), which is arranged to rotate a cam shaft 21, which in turn is arranged to slide inside a cam 22. In FIG. 4 the cam shaft 21 is in a lower position, whereas in FIG. 5 it has been rotated 90° around a vertical axis to an upper position. The cam house 23 that includes the cam 22 is prevented from rotating by screws 24, which are shown in FIG. 5. Further, the cam shaft 21 is connected to an outer lifting shaft 25. The connection of the cam shaft 21 to the outer lifting shaft 25 includes an axial bearing 28 that allows the cam shaft 21 to rotate with respect to the outer lifting shaft 25, but that hinders any axial, i.e. vertical, movement there between. Hence, as the cam shaft 21 is rotated in the cam 22 and is forced to move vertically as a function of the profile of the cam, the outer lifting shaft 25 will move along with it in the vertical direction.

As is visible in FIGS. 4 and 5 the outer lifting shaft 25 is connected to the first connection point 13 which supports heat preserving support 2. The second connection point 14 (which is intended to just support rack 4) is, on the other hand, connected to an inner lifting shaft 26, which is located inside the outer lifting shaft 25. Both the outer and the inner lifting shaft 25, 26 are affected equally by the movement of the first driving arrangement 11. Thus the first driving arrangement 11 does not affect the mutual relation between the outer and the inner lifting shafts 25, 26. This mutual relation is instead governed by the second driving arrangement 12.

The second driving arrangement 12 comprises a second actuator 16, which is arranged to affect the mutual relation between the outer and the inner lifting shafts 25, 26 in order to move the grip arm constituting the second connection point 14 to different functional positions.

The inner shaft 26 is arranged to slide inside the outer shaft 25, wherein a first, lower end of the inner shaft 26 comprises the second connection point 14. The upper end of the inner shaft 26 is connected to and driven by the second driving arrangement 12, which drives the inner shaft 26 with respect to the outer shaft 25.

The second driving arrangement 12 comprises two opposed angled frames 32 and 33. In FIG. 6 it is apparent that an inner frame 32 is located inside an outer frame 33, and that the second actuator 16 is arranged inside the outer frame 33 with a first end 16a attached to the inside of the outer frame 33 and with a second opposite end 16b attached to the outside of the inner frame 32. Hence, when the second actuator 16 is extended, the inner frame 32 is pushed to the left L (in the view represented in FIG. 6) at the same time as the outer frame 33 is pushed to the right R. In other words the frames are pushed in opposite directions by the action of the actuator.

In FIG. 4 the second driving arrangement 12 is illustrated in its lowest position, i.e. with the upper bearing 35 supported by the straight parts 32a, 33a of the inner and outer frame 32, 33, respectively. In this position the actuator 34 is fully retracted. In FIG. 5, on the other hand, the actuator 34 has been extracted, such that the frames 32 and 33 have been pushed apart, wherein the upper bearing 35 has been slightly raised with respect to a lower bearing 36 and rests on the sloping parts 32b, 33b of the of the inner and outer frame 32, 33, respectively. The upper bearing 35 is connected to the inner shaft 26, and the lower bearing 36 is connected to the outer shaft 25.

Hence any movement of the upper bearing 35 with respect to the lower bearing 36 implies a movement of the inner shaft 26 with respect to the outer shaft 25.

Therefore, as the shafts 25, 26 are connected to different connection points 13, 14 any movement of the second actuator 16 will imply movement between the connection points and hence movement between the support 2 and the rack 4.

As indicated above the second driving arrangement 12 offers the possibility to fine adjust the position of the rack 4 with respect to the support 2, in order to achieve a desired contact surface or distance between the pieces of bread 5 and the heat preserving plates 3. The adjustment of the second driving arrangement 12 may be performed before every single baking operation. However, an advantage of the presented embodiment of the invention is that it is not necessary to adjust the second driving arrangement 12 between similar consecutive baking operations if a well-functioning degree of contact or distance has been established between the pieces of bread 5 and the heat preserving plates 3.

As is visible in FIGS. 1 and 2, the shape of the second connection point 14 allows for a certain level of freedom for the adjustment of the second driving arrangement 12 with respect to the horizontal bar 8 of the rack 4. Namely, the gap between the jaws of the hooks of the connection point 14 corresponds to the possible position of the second driving arrangement 12 in such a way that the horizontal bar 8 will fit inside the second connection point 14 regardless of the position of the actuator of the second driving arrangement 12. Hence, the rack 4 may be inserted into and withdrawn from the second connection point 14 regardless of the position of the second driving arrangement 12. On the other hand the rack 4 may only be withdrawn from the oven when the first driving arrangement is in its lower position, such that the wheels 7 of the rack will be in contact with the oven floor. If different racks 4 of different height are to be used in the oven 1, the racks may be furnished with an individual identity code, such as e.g. an RFID, a bar code, or the like. Such an identity code would make it possible to easily identify all racks and to individually adjust the second driving arrangement 12 to a predetermined height which is suitable for the type of rack being used. The individual adjustment could be achieved by means of a computer processor connected to said driving arrangement.

The second driving arrangement 12 is connected to the fixed cam house 23 of the first driving arrangement 11 via a link arm 37. The link arm 37 keeps the second driving arrangement 13 from rotating.

Two embodiments of the first driving arrangement 12 are shown in FIG. 6. These may be used regardless of each other and normally only one of them is part of the arrangement. The first embodiment of the first driving arrangement 12 includes a first actuator 15, which is arranged to rotate the cam shaft 21. In FIG. 6 the actuator 15 is in its most retracted position, in which the cam shaft 21 is located in the lowest part of the cam 22, corresponding to the position shown FIG. 4. When the actuator 15 is extended the actuator arm 17 will act on the extension 20 of the cam shaft 21. Typically, the cam shaft 21 is rotated a quarter of a revolution, i.e. 90°, such that the extension 20 of the cam shaft 21 will point downwards in FIG. 4.

In the second embodiment of the first driving arrangement 12, shown in dash and dot lines in FIG. 6, the extension 20 of the cam shaft 21 is governed by the opening and closing of the oven door 18. A dowel 19 is arranged on the door and connected to the cam shaft extension 20 via an arm 27. The position and angle of the dowel 19 is adapted such that a desired rotation of the cam shaft 21 is achieved by a full opening of the oven door 18. In addition, a weight compensation arrangement may be provided. The support 2, including the heat preserving plates 3 is relatively heavy, such that it is difficult to lift it by hand power by closing the door. A weight compensation arrangement could even out the weight of the support 2 and reduce the power needed to lift it to a suitable level. No weight compensation arrangement is shown in the figures. It is however obvious to a skilled person to implement such a system, such that a detailed representation of it may be omitted in this description. In FIG. 6 a rotational driving arrangement 40 is shown. The driving arrangement 40 includes a motor 41 that drives a driving wheel 42 that is connected via an endless belt 43 to drive a second wheel 44, which is fixedly connected to the outer shaft 25. Hence the rotational driving arrangement 40 drives the outer shaft 25. As has been indicated above the first and second driving arrangements 11, 12 are arranged to the shafts 25 and 26, respectively, in a manner that allows the shafts to rotate.

The first drive arrangement 11 is connected to the outer shaft 25 via the cam shaft 21, which is arranged to the outer shaft via an axial bearing 28 that allows the outer shaft 25 to rotate with respect to the cam shaft 21 (c.f. FIG. 5). The second drive arrangement 12 is connected to the inner shaft 26 via an upper axial bearing 35 and to the outer shaft 25 via a lower axial bearing 36. Hence, the second drive arrangement 12 is also connected to the shafts 25, 26 in a way that allows the shafts 25, 26 to rotate.

Preferably, the inner shaft 26 and the outer shaft 25 are interconnected such they will rotate together. This interconnection may consist of a track and projection between the shafts 25, 26 or any other type of conventional arrangement for preventing mutual rotation between two coaxial shafts.

Hence, by means of the driving arrangement 40 it is possible to make both the connection points rotate jointly. This is a great advantage as it means that the support 2 and the rack 4 may rotate together during a baking operation. This is advantageous since is it almost impossible to obtain an even heat inside a rack oven, and that otherwise the pieces of bread would not be evenly heated. This problem is solved by the rotation of the rack and support, as it implies that the pieces of bread will be moved around inside the oven and thereby passes through the zones of somewhat different temperature at regular intervals. Such intermittent heating is not a problem compared to the problem of a static temperature difference.

In one embodiment that is not shown the cam 22 may include a depression into which the cam shaft 21 may be fitted in order to lower the support 2 all the way down to the oven floor 9. This position is useful for those occasions when the support 2 shall be connected to or released from the first connection point 13. The position does however not need to be used between two consecutive baking operations if the support is to be used in both of these operations.

Above, the invention has been described with reference to specific embodiments. It is, however, obvious to a person skilled in the art that other embodiments may be used to achieve the same result within the scope of the invention. Hence, the invention is not limited by these embodiments; instead it is only limited by the appended claims.

The invention claimed is:

1. A device in a rack oven for adjusting the distance between a support comprising horizontal heat preserving plates and a bread-carrying rack comprising levels of bread-supporting material, comprising:
   a first connector for connection to the heat preserving support inside the oven;
   a first driving arrangement for regulating the height of the first connector and the heat preserving plates of said support from a first, passive position where bread supporting material is not in contact with the heat preserving plates to a second, active position where said bread-supporting material can be in contact with the heat preserving plates; and
   a second driving arrangement including a second connector for connection to the bread-carrying rack,
   wherein the second driving arrangement is arranged to adjust the height of the second connector with respect to the first connector in order to simultaneously adjust the distance between all the horizontal heat preserving plates of the support and the levels of bread-supporting material of the bread-carrying rack, and
   the first driving arrangement is arranged to adjust the height of both the first connector and the second connector.

2. The device according to claim 1, wherein an arrangement is arranged to rotate both the first connector and the second connector with respect to the inside of the oven, such that the rack and the support will be rotated together.

3. The device according to claim 1, wherein the first driving arrangement is connected to the opening of a door of the rack oven, such that the first connector is in the passive position when the door is fully open and is lifted to the elevated active position when the door is closed.

4. The device according to claim 1, wherein the first driving arrangement comprises a first actuator, which is arranged to drive the first connector between the passive position and the elevated active position.

5. The device according to claim 1, which device comprises a two part shaft comprising an outer shaft and an inner shaft which is arranged to slide with respect to and inside the outer shaft, wherein the first driving arrangement is arranged to adjust the height of both the outer shaft and the inner shaft, the outer shaft being connected to the first connector, and wherein the second driving arrangement is arranged to adjust the height of the inner shaft with respect to the outer shaft, the inner shaft being connected to the second connector.

6. The device according to claim 5, wherein the first driving arrangement includes a first actuator that drives a cam shaft inside an axial cam, and wherein the cam shaft is connected to the outer shaft via an axial bearing, such that it is free to rotate with respect to the outer shaft but is restricted from axial movement with respect to it.

7. The device according to claim 6, wherein the second driving arrangement includes a second actuator which is located between an inner frame and an outer frame, and wherein the frames separates an upper bearing from a lower bearing, the upper bearing being connected to the inner shaft and the lower bearing being connected to the outer shaft, and wherein the frames comprises a sloping upper part, which when the frames are parted from each other by the extension of the actuator forces the upper bearing further away from a lower bearing, such that the inner shaft is elevated with respect to the outer shaft and such that the second connector is elevated with respect to the first connector.

8. A baking oven arranged to house a bread-carrying rack and a support comprising horizontal heat preserving plates, comprising the device according to claim 1.

9. The device according to claim 2, wherein the first driving arrangement is connected to the opening of a door of the rack oven, such that the first connector is in the passive position when the door is fully open and is lifted to the elevated active position when the door is closed.

10. The device according to claim 2, wherein the first driving arrangement comprises a first actuator, which is arranged to drive the connector between the passive position and the elevated active position.

11. A device in a rack oven for adjusting the distance between a support comprising horizontal heat preserving plates and a bread-carrying rack comprising levels of bread-supporting material, comprising:
   a first connector for connection to the heat preserving support inside the oven;
   a first driving arrangement for regulating the height of the first connector and the heat preserving plates of said support from a first, passive position where bread supporting material is not in contact with the heat preserving plates to a second, active position where said bread-supporting material can be in contact with the heat preserving plates; and
   a second driving arrangement including a second connector for connection to the bread-carrying rack,
   wherein the second driving arrangement is arranged to adjust the height of the second connector with respect to the first connector in order to simultaneously adjust the distance between all the horizontal heat preserving plates of the support and the levels of bread-supporting material of the bread-carrying rack, an arrangement is arranged to rotate both the first connector and the second connector with respect to the inside of the oven, such that the rack and the support will be rotated together, and the first driving arrangement is arranged to adjust the height of both the first connector and the second connector.

12. A baking oven arranged to house a bread-carrying rack and a support comprising horizontal heat preserving plates, comprising the device according to claim 2.

13. A baking oven arranged to house a bread-carrying rack and a support comprising horizontal heat preserving plates, comprising the device according to claim 3.

14. A baking oven arranged to house a bread-carrying rack and a support comprising horizontal heat preserving plates, comprising the device according to claim 4.

15. A baking oven arranged to house a bread-carrying rack and a support comprising horizontal heat preserving plates, comprising a device in a rack oven for adjusting the distance between a support comprising horizontal heat preserving plates and a bread-carrying rack comprising levels of bread-supporting material, comprising:

a first connector for connection to the heat preserving support inside the oven;

a first driving arrangement for regulating the height of the first connector and the heat preserving plates of said support from a first, passive position where bread supporting material is not in contact with the heat preserving plates to a second, active position where said bread-supporting material can be in contact with the heat preserving plates; and a second driving arrangement including a second connector for connection to the bread-carrying rack, wherein the second driving arrangement is arranged to adjust the height of the second connector with respect to the first connector in order to simultaneously adjust the distance between all the horizontal heat preserving plates of the support and the levels of bread-supporting material of the bread-carrying rack, and the first driving arrangement is arranged to adjust the height of both the first connector and the second connector.

* * * * *